United States Patent
Kremers et al.

(10) Patent No.: US 6,923,853 B2
(45) Date of Patent: Aug. 2, 2005

(54) MELTABLE INK FOR AN INKJET PRINTER AND A METHOD OF SELECTING SUCH AN INK

(75) Inventors: Martinus Antonius Kremers, Ottersum (NL); Maurice Hendrikus Hubertinus Thijssen, Deurne (NL); Berby Marga Gerarda Weitenauer, Venlo (NL)

(73) Assignee: Oce Technologies, B.V., Venio (NL)

( * ) Notice: Subject to any disclaimer, the term of this patent is extended or adjusted under 35 U.S.C. 154(b) by 0 days.

(21) Appl. No.: 10/611,877

(22) Filed: Jul. 3, 2003

(65) Prior Publication Data
US 2004/0021754 A1 Feb. 5, 2004

(30) Foreign Application Priority Data
Jul. 5, 2002 (NL) .............................. 1021011

(51) Int. Cl.⁷ .................... C09D 11/02; C09D 11/00
(52) U.S. Cl. .................... 106/31.29; 106/31.61; 347/100
(58) Field of Search ............. 106/31.29, 31.61; 347/100

(56) References Cited

U.S. PATENT DOCUMENTS

| | | | |
|---|---|---|---|
| 5,372,852 A | | 12/1994 | Titterington et al. |
| 6,071,986 A | * | 6/2000 | Everhardus et al. ........ 523/160 |
| 6,097,921 A | | 8/2000 | Kageyama |
| 6,280,510 B1 | * | 8/2001 | Kelderman et al. ...... 106/31.29 |
| 6,471,758 B1 | * | 10/2002 | Kelderman et al. ...... 106/31.29 |
| 2004/0017455 A1 | * | 1/2004 | Kremers et al. ............ 347/103 |

FOREIGN PATENT DOCUMENTS

EP         1378551 A1 *  1/2004   ........... C09D/11/00

* cited by examiner

*Primary Examiner*—J. A. Lorengo
*Assistant Examiner*—Veronica F. Faison
(74) *Attorney, Agent, or Firm*—Birch, Stewart, Kolasch & Birch, LLP

(57) ABSTRACT

A meltable ink which is solid at room temperature, which ink is suitable for use in an indirect printing process, in which printing process the ink is transferred, by the use of an inkjet printhead, to a transfer element, whereafter the ink is transferred to a receiving material under pressure from the transfer element, the ink having a composition such that it is pressure-transferable at a temperature between a bottom temperature limit and a top temperature limit, wherein the ink has a deformation energy of less than $20 \times 10^5$ Pa.s at a temperature equal to said top temperature limit.

9 Claims, 3 Drawing Sheets

MELTABLE INK FOR AN INKJET PRINTER AND A METHOD OF SELECTING SUCH AN INK

This non-provisional application claims priority under 35 U.S.C. 119(a) on Dutch Patent Application No. 1021011, filed in The Netherlands on Jul. 5, 2002, the contents of which are hereby incorporated by reference.

BACKGROUND OF THE INVENTION

The present invention relates to a meltable ink which is solid at room temperature, which ink is suitable for use in an indirect printing process. In this printing process, the ink is transferred, by the use of an inkjet printhead, to a transfer element, whereafter the ink is transferred to a receiving material under pressure from the transfer element. The ink has a composition such that it is pressure-transferable at a temperature between a bottom limit and a top limit. The invention also relates to a method of selecting a meltable ink for use in such a printing process.

SUMMARY OF THE INVENTION

An ink of this kind (also known as a hot melt ink) is disclosed in U.S. Pat. No. 5,372,852. The ink is printed indirectly, i.e. via an intermediate transfer element, on a receiving material, for example, a sheet of paper or a plastic overhead sheet. For this purpose, the temperature of the ink is raised so that it is liquid, whereafter the liquid ink is transferred imagewise by means of an inkjet printhead on to a liquid transfer surface applied to the transfer element, for example, a thin layer of silicone oil applied to a metal roller. The temperature of the transfer element is lower than the melting temperature of the ink, but higher than room temperature. As soon as the ink is transferred to the transfer element, it will cool and finally assume a solid consistency. Because of the small thermal capacity of an individual ink drop, it often cools very rapidly so that its temperature is practically immediately equal—at least for an appreciable part—to the temperature of the transfer element. The ink is of a composition such that under the conditions indicated hereinbefore, and particularly at the temperature of the transfer element, it is malleable and has specific visco-elastic properties which make it possible for the ink to be pressure-transferable, i.e., under pressure and in a certain temperature range it is sufficiently deformable to fuse on a receiving material but also has sufficient cohesion not to split during the transfer (cohesive failure). At a temperature higher than the top limit, the ink is insufficiently cohesive and will split during the transfer process. As a result, some of the ink will remain on the transfer element, and this has an adverse effect on print quality. In addition, the residual ink must be removed from the transfer element in order to avoid ghost images on a following receiving material. At a temperature below the bottom limit, the ink has too high a compressive yield stress to fuse completely on the receiving material. In order to print the ink on a receiving material, the latter is brought into contact with the transfer element in a transfer nip, where the pressure is greater than the compressive yield stress of the ink in compression. As a result, the malleable ink transfers from the liquid transfer surface to the receiving material. As a result of this indirect printing process, the individual ink drops are flat, well defined and beautifully round independently of the receiving material used. In particular, this printing technique is suitable for printing transparent films because the light scattered by each individual drop is minimized due to the flattening of the ink drops. An additional advantage of the fusing is that there is less ink required per unit of area. A print quality of this kind cannot be obtained with a direct printing process, i.e., a printing process in which ink drops are applied to a receiving material directly by means of a printhead.

Inks must satisfy very specific requirements with respect to their visco-elastic properties in order to be pressure-transferable, this being a condition for a successful application in the known indirect printing process. U.S. Pat. No. 5,372,852 and the Journal of Imaging Science and Technology, Vol. 40, No. 5, September/October 1996, pages 386 to 389, give examples of measurements by means of which it is possible to determine whether an ink is pressure-transferable. Since it is not possible to predict beforehand whether a specific ink is pressure-transferable, it is possible, using the known measurements, to select from a set of inks one which can be used in such an indirect printing process.

However, the known pressure-transferable inks have one significant disadvantage. It has been found that the ink transfers relatively unsatisfactorily from the transfer element to the receiving material. To obtain a sufficiently high transfer yield, it is necessary to provide the transfer element with a thin layer of liquid during printing, and in addition a high transfer pressure must be applied and it has been found necessary to preheat the receiving material. The surface energy of the transfer element is lowered by the silicone oil so that the ink becomes more readily detached from the surface of said element. Under these conditions the liquid also partially transfers to the receiving material because this liquid exhibits cohesive failure on transfer of the ink drops to the receiving material. That is also why the layer of liquid must be replenished prior to each new image for printing. The transfer element is often completely devoid of the residues of the old liquid layer and ink remaining therein, and a new layer is applied. The need for a "sacrifice layer" of this kind makes the printing process very complex because the transfer element must be repeatedly provided with a defined thin layer of liquid. In addition, the liquid partially fuses on the receiving material which is soiled as a result with the liquid and, for example, in the case of silicone oil feels "greasy". A layer of liquid of this kind, particularly if it contains an oil with a low surface tension, also causes soiling of the interior of the printer in which the printing process takes place. It has also been found that a high pressure is needed in the transfer nip in order to obtain a sufficiently high transfer yield. Pressures of this kind can only be achieved with pressure rollers which are sufficiently rigid, particularly metal rollers, and which are rigidly suspended in the printer. Rollers of this kind and their suspension are expensive, and also the maximum width for printing is limited as a result (longer rollers would sag earlier). Preheating the receiving material is necessary in order to reduce the compressive yield stress of the ink so that it can be fused more easily. However, this has the disadvantage that in addition to the fact that an extra process step is required considerable energy is used as a result.

The object of the invention is to obtain an ink which transfers easily under pressure. In addition, another object of the invention is to provide a method whereby it is possible to select an ink which transfers easily. To this end, an ink has been invented in accordance with the above discussion which is characterized in that the ink has a deformation energy of less than $20 \times 10^5$ Pa.s at a temperature equal to the top limit. A method has also been invented in accordance with the present invention which comprises measuring the deformation energy of the ink at the said top limit, and selecting the ink if the deformation energy is less than $20 \times 10^5$ Pa.s.

It has surprisingly been found that it is precisely the deformation energy that is an important index of the ease with which inks transfer, and not, as known from the prior art, the compressive yield stress of an ink. The reason for this is not quite clear, but is probably associated with the fact that the inks remain in the transfer nip for only a short period. Time is necessary to actually deform the ink drops. This time probably depends less on the absolute force required to subject the ink to deformation initially, and more on the final total quantity of energy required to obtain deformation of an ink drop.

Inks according to the invention have been found to transfer very easily under pressure. By using ink compositions having a deformation energy according to the invention, it is possible to obviate each of the above-described disadvantages. Use of a metal transfer element with a liquid transfer surface disposed thereon, cleaning of the transfer element for each new image, the high transfer pressure, and preheating of the receiving material for printing can all be dispensed with when inks of the kind described herein are used in the above-described indirect printing process. In this way, a much simpler printing process is obtained which is therefore cheaper and much more economical in terms of energy. It has particularly been found advantageous to dispense with pressure rollers having a complicated and heavy construction such as a very rigid curved or non-curved metal pressure roller which must be rigidly suspended in a frame in order to obtain an adequate transfer yield. Instead, a much lighter and hence cheaper construction can be selected. The inks according to the invention offer the possibility of choice of a rubberized roller or even a rubber belt as a transfer element. Rubber has the advantage that a very even transfer nip forms, to the benefit of the print quality. A rubber intermediate is also better able to follow an uneven surface of the receiving material. This benefits the uniformity of an image printed on a receiving material. Rubber also has the advantage of double speed duplex printing of a receiving material in one nip, for example, as disclosed in U.S. Pat. No. 6,097,921. This is not possible with metal printing media as an intermediate, because an even nip can never be formed between two metal rollers.

The use of a belt constructed with at least a rubber top layer also offers a number of other advantages. The weight of a rubber belt is very much less than that of a metal roller, so that the construction of the printer has to satisfy less stringent requirements while in addition a lower weight is more favorable in energy terms. In addition, the space occupied by a rubber belt is much smaller, because a belt is simply trained over a set of rollers. Particularly if a plurality of printheads is used in order to obtain greater productivity, this offers a great advantage because the printer can then be of compact construction. In addition to the fact that inks according to the present invention have been found to transfer easily even with a relatively soft intermediate, it has also been found that a high transfer yield with good print quality can still be obtained with much shorter contact times in the fusing nip. This offers the particular advantage that the printing process can take place at a much higher speed so that the productivity of the corresponding printer can be much greater.

In a further embodiment, the ink has a deformation energy less than $10 \times 10^5$ Pa.s at a temperature equal to the top limit. A problem with inkjet inks is that often considerable ink is required per unit of area in order to obtain a high degree of coverage. It has surprisingly been found that considerably less ink is required if the deformation energy is less than $10 \times 10^5$ Pa.s. Further investigation shows that ink drops of an ink according to this embodiment have an appreciable increase in spread when they are transferred to the receiving material. This spread is such that considerably less ink is required to obtain a high degree of coverage. An additional advantage is that the intensively spread and hence practically flat ink drops scatter much less transmitted light after transfer. This is a further improvement with respect to known inks.

In a further embodiment, at a temperature equal to the top limit, the ink has a deformation energy less than $2 \times 10^5$ Pa.s. One problem with the known inks is that an after-fusing step is often necessary for good contact between the fused ink drops and the receiving material (depending on the type of receiving material inter alia), for example, a step in which the printed receiving material is heated and the ink is pressed further into the material under pressure. It has been found that if an ink composition is used having a deformation energy less than $2 \times 10^5$ Pa.s, there is no longer any need for after-fusing. The effect of such a low deformation energy is evidently that the ink drops have already been brought into contact with the receiving material in the transfer nip to the maximum extent.

In one embodiment of the present invention, the ink contains a semi-crystalline binder and a crystalline thickener. A semi-crystalline binder is selected typically from the group of amide resins, for example, Unirez 2974 and 2980 of Union Camp Corporation (Arizona Chemical), Versamid 335 and Casamid 874, 876 or 879 of Henkel Hakusui, but it is also possible to use a different resin, for example, Uratak 68520 of DSM. A crystallizing thickener is typically a gelling agent, for example as known from EP 1 067 157 A1 (Table 1). An ink of this kind has the advantage that with the use of just two components it is possible to make a pressure-transferable ink. In one embodiment, for example, the meltable component of the ink contains 50% by weight of each of the components. A disadvantage is that the deformation energy is not particularly low, so that the ink drop spread is not maximum.

In another embodiment of the process according to the invention, the ink contains a binder, an amorphously solidifying softener and a crystalline thickener. Binders are used to a great extent in meltable inks and are known, for example, from U.S. Pat. No. 6,071,986 (Table 2). Amorphously solidifying softeners are often monomer or oligomer compounds which nevertheless solidify amorphously despite their low molecular weight. Examples of such compounds can be found in U.S. Pat. No. 6,071,986 (Table 1), U.S. Pat. No. 6,280,510 (Table 1) and EP 1 067 157 A1 (Table 3a). The advantage of the ink according to this embodiment is that the amorphous fraction can be very high, up to 90%, without the jet viscosity becoming unacceptably high. To make the ink pressure-transferable, only a little crystallizing thickener is required, typically about 10%. The amorphous binder, typically used in quantities of up to 50%, prevents the amorphously solidifying softener from subsequently crystallizing after the ink has been transferred to a receiving material.

In another embodiment of the present invention, the ink contains a crystalline-solidifying softener, a crystalline thickener and optionally a binder. Crystalline-solidifying softeners are sufficiently known from the prior art and generally contain low molecular weight crystalline compounds such as mono-amides, alcohols, esters, etc. The advantage of the ink according to this embodiment is that a pressure-transferable ink can be made which nevertheless contains a high fraction (up to 100%) of crystalline material.

An ink of this kind generally has an extremely low jet viscosity so that very small ink drops can be jetted. The reason why an ink of this kind can be pressure-transferable, even if the entire meltable matrix is crystalline, is associated with the fact that these inks exhibit two crystallization types on cooling. A first type is where the ink partially crystallizes rapidly and to a small extent at a relatively high temperature, and a second type is where the ink further crystallizes at a lower temperature. With the first type of crystallization, a compacted amorphous matrix forms which is readily pressure-deformable. The matrix becomes hard only after the second crystallization type. Upon heating, the crystallized ink does not become fluid until the melting temperature of the highest melting component has been reached. The advantage of this is that an image once printed is practically insensitive to mechanical impact such as gumming and scratching, because the ink remains hard up to a high temperature.

The invention will now be explained with reference to the following examples.

Example 1. Description of an indirect inkjet printing process.

Example 2. Methods of determining whether an ink is pressure-transferable.

Example 3. Method of determining the top limit at which an ink is pressure-transferable.

Example 4. Method of determining whether an ink has a reversible melt and solidification behavior.

Example 5. Method of determining the deformation energy in Pa.s.

Example 6. Another method of determining the deformation energy in Pa.s.

Example 7. Inks known from the prior art.

Example 8. Inks according to the invention.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

EXAMPLE 1

Figure 1:
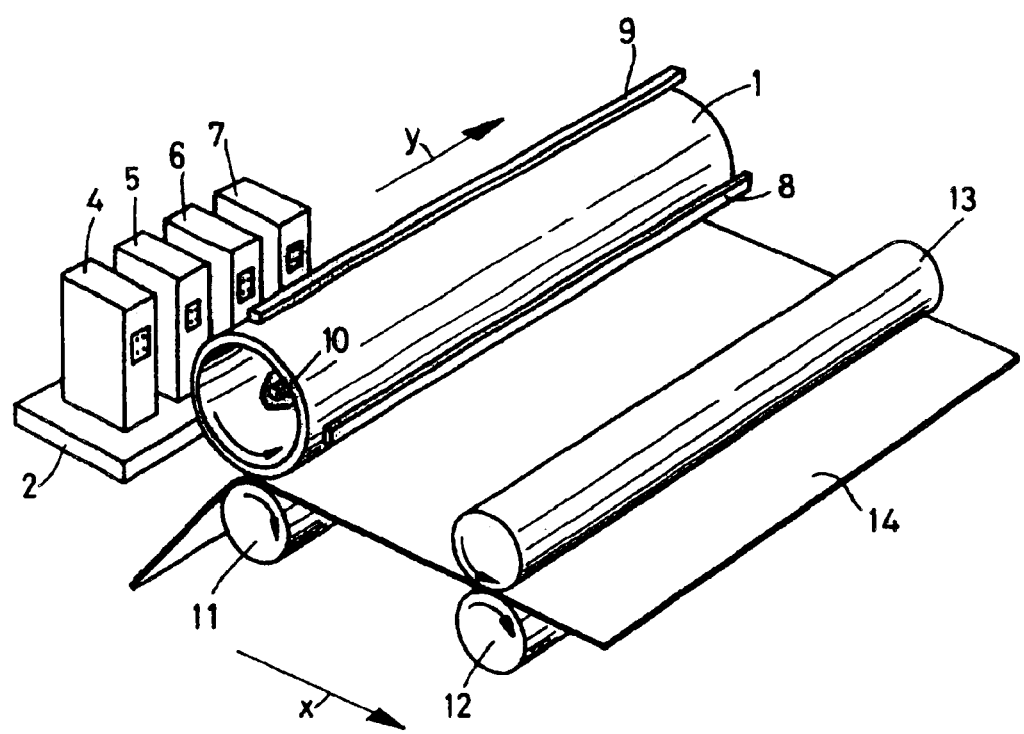
FIG. 1. Diagram showing an indirect inkjet printing process.

FIG. 1 diagrammatically shows the most important parts of an indirect inkjet method as known from the prior art. The transfer element 1 is disposed centrally in this process and in this case is a hollow aluminum roller. This roller is kept at an elevated temperature by means of a radiator 10 which selectively heats a specific area of the roller. The temperature is kept constant within a margin of a number of degrees by means of a temperature control system (not shown), in such manner that the temperature remains within the bottom limit and the top limit at which the ink is pressure-transferable. The transfer element is provided with a feed element 9 disposed at a distance and serving to provide the surface of the roller with a layer of silicone oil. An image is printed on this layer, which serves as a sacrifice layer, by means of a number of printheads (4, 5, 6 and 7, one for each of the colors cyan, magenta, yellow and black) disposed on a carriage 2. This can be carried out in various ways, for example as known from the prior art, and does not form part of this invention. In a typical embodiment, the carriage is moved in the indicated direction Y along the surface of the transfer element and ink is jetted from each of the printheads in the direction of the transfer element. As soon as a strip has been printed on the transfer element in this way, the element is rotated one increment further and the following strip is printed by moving the carriage back, i.e.,in the opposite direction to the indicated direction Y. In this way, an entire image can be built up on the transfer element. As soon as the image is ready, a transfer nip is formed by bringing companion roller 11 into contact with transfer element 1 at a specific pressure. The receiving material 14, more particularly a sheet of paper, is then fed through the transfer nip in the direction X by rotating the transfer element and the companion roller in the indicated directions. Under these conditions, the image is transferred from the transfer element to the receiving material. After this transfer, any residual image still present on the transfer element is removed, together with the remaining silicone oil, from the surface by the use of cleaning element 8. The printed receiving material is fed through an after-fusing station consisting of the heated rollers 12 and 13 rotating in the indicated directions. This step, in which both heat and pressure are applied, results in good adhesion between the ink and the receiving material.

EXAMPLE 2

It is not possible to predict beforehand whether a specific meltable ink is pressure-transferable. The literature discloses analytical methods to determine whether a specific ink is pressure-transferable, for example U.S. Pat. No. 5,372,852 and the Journal of Imaging Science and Technology, Vol. 40, No. 5, September/October 1996, pages 386 to 389. However, it is also possible to subject a specific ink to a practical test. For this purpose, it is possible to use a printing system which applies an indirect inkjet process as the method. In this example, a generally available printer is used, namely the Phaser 840 Xerox printer. The ink concerned is loaded in the inkjet printhead of this printer and then printing is carried out. It is also possible to use a different printhead to apply the ink to the transfer element, for example, a printhead specially developed to use the ink under test. In principle, any method of applying a thin layer of ink (typically 10 to 100 $\mu$m) to the transfer element can be used.

To determine the pressure-transferability, the ink must be transferred at different temperatures from the transfer element to a receiving material. In a first measurement, the transfer element is set to a temperature far above the melting temperature of the ink. Typically, hot melt inks melt at 40–80° C., i.e., an initial temperature of 100° C. will normally be sufficient. It is then necessary to determine what the transfer yield is in the case of a single transfer (single contact between each ink drop on the transfer element and the receiving material); see Example 3 for the determination of this yield. If the ink is not pressure-transferable at this temperature, there will in fact be a stamping process with a low transfer yield, for example, 5 to 10%. The temperature of the transfer element must then be lowered, for example, by 5° C. The transfer yield will then be determined afresh. The temperature of the transfer element can then again be lowered by 5° C. to make another print and determine the transfer yield. In this way, the entire temperature area up to room temperature can be investigated. If there is a temperature area where the transfer yield is higher than 90%, then the ink is said to be pressure-transferable.

EXAMPLE 3

This Example indicates how the transfer yield can be determined at a specific temperature and, if there is a transfer working range, what the top and bottom temperature limits of such range are.

An explanation will first be given as to how the transfer yield can be determined at a specific temperature of the transfer element. The transfer yield is defined as the optical density of a printed image in the case of a single transfer (i.e., the receiving material has been in contact with the image on the transfer element only once), divided by the optical density in the case of a 100% transfer:

$$\eta_T = (OD)_{T,1}/(OD)_{100\%} \quad (1)$$

where $\eta_T$ is the transfer yield at a temperature T of the transfer element, $(OD)_{T,1}$ is the optical density of a single transfer at a temperature T of the transfer element and $(OD)_{100\%}$ is the optical density in the case of a 100% transfer. $(OD)_{T,1}$ is measured with a Gretag densitometer (Gretag D183 OD-meter) by measuring the optical density of the image as transferred to a receiving material at a temperature T of the transfer element. $(OD)_{100\%}$ is a theoretical value which for most inks will not be achieved in a single transfer at a specific T. However, this value can also be determined if the transfer is not complete, for example, 20% in one step. In that case, a residual image of 80% will remain on the transfer element. By carrying out a subsequent transfer with this transfer element, part of the ink will again be transferred to a new sheet of receiving material that has been introduced. For this purpose, it is necessary for the residual image not to be removed from the transfer element after the first transfer step. Thus, the cleaners and the like must be temporarily rendered inoperative. By carrying out transfer so often that no more ink is found on the transfer element, the image as was initially printed on the transfer element will be transferred in a number of steps (1, 2, 3 . . . n) to the same number of sheets of receiving material (sheet 1, sheet 2, sheet 3, . . . sheet n). By adding the optical densities of each of the sheets 1 to n, the value for $(OD)_{100\%}$ is obtained.

$$(OD)_{100\%} = (OD)_1 + (OD)_2 + (OD)_3 + \ldots + (OD)_n \quad (2)$$

In principle, the temperature at which the transfer element $(OD)_{100\%}$ is determined can be selected freely, but the determination is more accurate with the smaller the number of sheets required to achieve 100% transfer. Thus, $(OD)_{100\%}$ is preferably determined in the temperature range in which the ink is pressure-transferable. Preferably again, $(OD)_{100\%}$ is determined at the same temperature as the temperature at which the transfer yield $\eta_T$ is determined.

By combining formula (1) and formula (2) the transfer yield can be determined at any arbitrary temperature T of the transfer element:

$$\eta_T = (OD)_{T,1}/((OD)_1 + (OD)_2 + (OD)_3 + \ldots + (OD)_n) \quad (3)$$

In order to determine whether there is a working transfer area or, in other words, whether the ink is pressure-transferable, the method according to Example 2 can be used. Thus, it is possible to determine roughly whether there is a working transfer area and, if so, where the top and bottom limits are situated approximately. To determine this accurately, the transfer yield must be re-determined around the roughly determined limits but now in steps of 1° C. in the temperature of the transfer element. By plotting a curve (transfer yield against temperature), it is then possible to determine the top and bottom limits accurately. The top limit is the temperature of the transfer element at which the transfer yield is just 90%. Above this temperature, there will be a more cohesive breakage of an ink drop for transfer, and the yield will drop and in most cases reach a value of around 5%. The bottom limit is the temperature at which the yield is just 90%. Below this, the ink will not be able to deform sufficiently for sufficient transfer. The lower the temperature, the more the ink will assume a rigid consistency and finally hardly transfer any more.

EXAMPL 4

The deformation energy can be determined in accordance with one of the specifications as indicated in Examples 5 and 6. The specifications differ in the method in which the sample of the ink for measurement is brought to the measuring temperature. The specification as indicated in Example 5 is relatively simple. In this case, the sample is heated from the solid state (room temperature) to the measuring temperature. This simple determination, however, can only be used if the state that the ink reaches by heating from the solid state to the measuring temperature is equal to the state achieved if the ink is cooled from the melted state to said temperature (this being the practical situation during printing). If this is not the case, the specification according to Example 6 must be used, in which the sample, just as in practical printing, is cooled from the melt to the measuring temperature. Moreover, the specification according to Example 6 can always be used.

Figure 2:
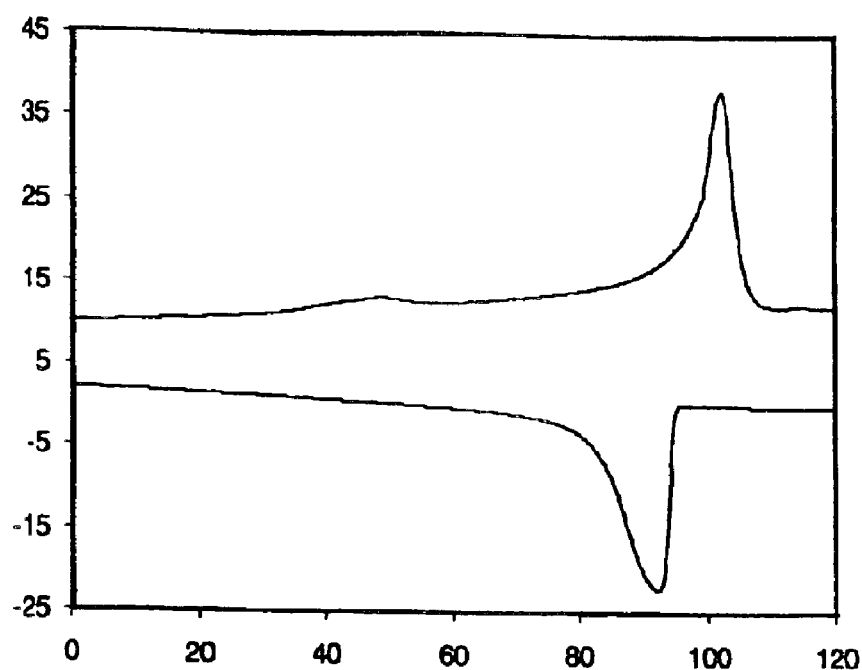
FIG. 2. Thermogram of an ink having a reversible melt and solidification behavior.

Using a differential scanning calorimeter, for example the Perkin Elmer DSC-7, it is often possible to determine, for an ink which is of simple composition (i.e., consists of a limited number of meltable carrier materials) whether such ink will, on heating from the solid state to the measuring temperature, achieve the same state as when cooling from the melt to the same measuring temperature. For this DSC analysis, approximately 6 mg of ink is weighed out in a 50 $\mu l$ aluminum 2 bar capsule, whereafter the capsule is placed in the DSC. A measuring program is then applied, in which the ink is first kept at −50° C. for 5 minutes, and is then heated at a rate of 20° C./min to at least 20° C. above the melting temperature of the ink. The ink is then kept at this highest temperature for 2 minutes, whereafter it is cooled at a rate of 20° C./min to −50° C. The ink is then kept at −50° for 5 minutes, whereafter the ink is re-heated to at least 20° C. above its melting point at a rate of 20° C./min. The first heating run is often used in order to determine the thermal history of the ink. The second heating run is used for the determination according to this Example. An example of a thermogram of an ink which reaches the same state during the heating of said ink from the solid state to 70° C. (the measuring temperature in this case) and the cooling of said ink from the melted state to 70° C. is given in FIG. 2. The measured heat flux is plotted on the y-axis in milliWatts (mW), and the temperature in degrees Celsius (° C.) is plotted on the x-axis. The ink in question has as its main constituents (meltable carrier materials) an amorphous binder (50%) and a crystalline diluent (50%). It will be seen that during the heating run (top curve) the ink in question has a melting peak at about 102° C. This means that the crystalline diluent is crystallized at the measuring temperature (assuming this to be 70° C.). On cooling from the melt (bottom curve), the ink has a solidification peak at approximately 92° C. This means that the crystalline diluent is also crystallized at 70° C. Thus, the deformation energy of this ink can be measured both in the solid state (Example 5) and in the liquid state (Example 6).

Figure 3:
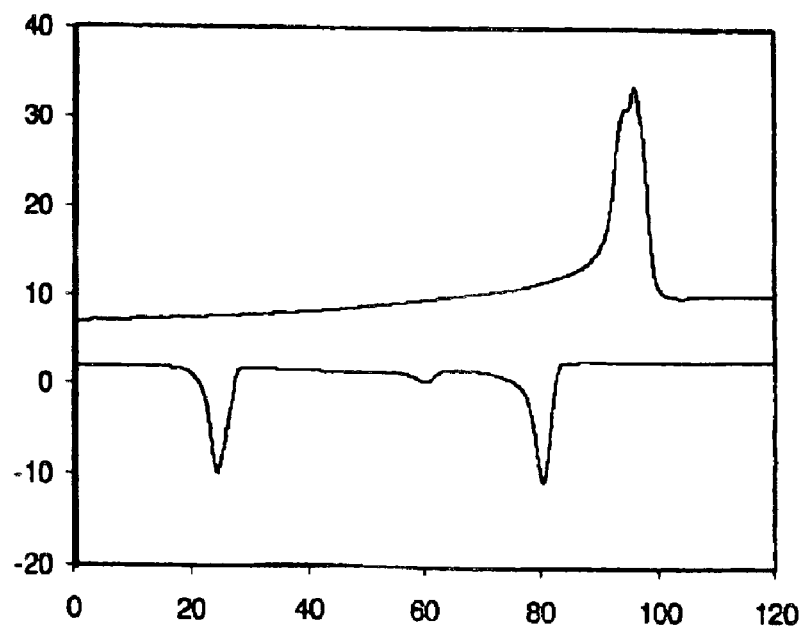
FIG. 3. Thermogram of an ink having a non-reversible melt and solidification behavior.

FIG. 3 (same axis distribution as in FIG. 2) shows a comparable thermogram, but of an ink which contains as meltable carrier materials an amorphous binder (25%) and two crystalline diluents (each 37.5%). On heating from the solid state, the ink has one (compound) melting peak at about 95° C. This means that the two crystalline diluents are crystallized at the measuring temperature (e.g. 70° C.). On cooling from the melt, it will be seen that one of the two crystalline diluents crystallizes at approximately 80° C. while the other does not crystallize until 25° C. This means that at 70° C. the latter diluent is still melted. This state differs considerably from the state achieved upon heating. Consequently, in this case, the measurement according to Example 5 is not suitable for determining the deformation energy.

EXAMPLE 5

The term deformation energy has been used for this invention. In actual fact, this is not the correct term, because this "energy" is not given in Joules, but in Pa.s (Pascal second). This unit is more an agreement with the quantity of absorbed energy per unit volume of ink multiplied by the time required to deform the ink (Pa.s is equal to $J/m^3 \times s$). This value is therefore dependent on the method used for measuring. However, by always performing the measurement in the same way, it is a good index of the actual energy required to deform the ink.

Figure 4:
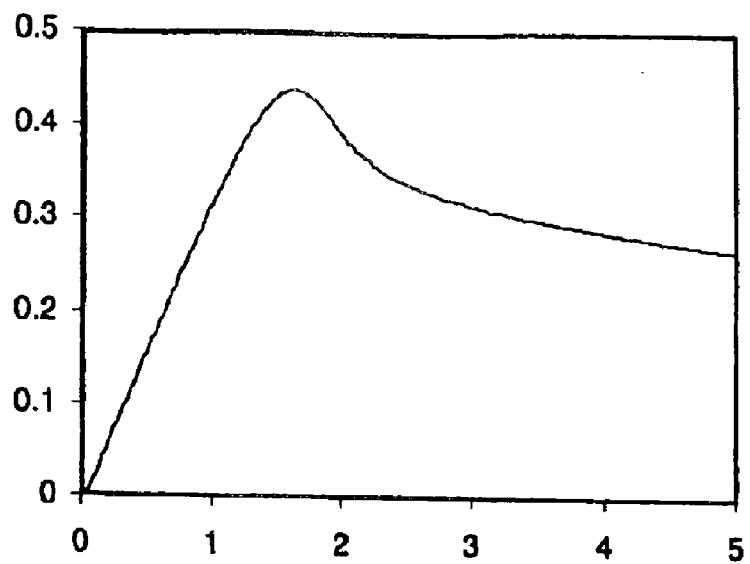
FIG. 4. Stress against time of an ink measured in accordance with Example 5.

If an ink reaches the same state from heating or cooling to the measuring temperature (as explained in Example 4), the deformation, energy at the top limit can be determined in a simple manner by the use of a rheometer, for example the RSA II (Rheometrics). For this purpose, a solid ink film is first made with a thickness of about 2.5 mm. For this purpose, a quantity of ink is melted and poured in a liquid state over a silicone rubber surface with an upright edge so that an ink film forms with a thickness of about 2.5 mm. The ink is then allowed to solidify. A pellet having a cross-section of 4.15 mm is then punched out of the solidified film with a corkscrew. This pellet is transferred to between the two flat plates of the rheometer, which plates have a diameter of about 1 cm. On both sides, the plates are brought into contact with the pellet (it is important that the two surfaces of the pellet are as parallel as possible to the rheometer plates). The entire rig, or at least the plates including the pellet, is heated by means of an oven to the top temperature at which the ink is pressure-transferable. The oven and the plates have already been brought to the required temperature under stable conditions before the sample is placed between the plates. As soon as the top temperature has been reached, it is maintained for at least 15 minutes in order to stabilize the temperature of the rig. The pellet is then compressed between the plates at a rate of 4% per second until there is at least a deformation of 20%. During the deformation, the force is measured which is required to apply the deformation. The required stress can be calculated from this force (=force divided by the area of the sample). The curve showing this stress against the time can be used to determine the deformation energy. A curve of this kind is shown in FIG. 4, where the applied stress in MPa ($10^6$ Pa) has been plotted on the y-axis against the time in seconds on the x-axis. The deformation energy associated with a 20% deformation, which is reached after 5 seconds in this measurement, is the area beneath the curve. The reproducibility of this measurement depends on a number of factors, the most important being the sample preparation. If a pellet is not homogeneous or if the two surfaces of the pellet are not plane-parallel, this will result in deviations in the measured deformation energy with respect to the actual value. Systematic deviations can be eliminated by performing the measurement frequently and averaging the measured values. In this way, an accurate determination can be carried out.

EXAMPLE 6

This example describes a procedure for measuring the deformation energy of an ink, said measuring being applicable to any type of ink. In this measurement, the ink is cooled from the liquid state, at a temperature equal for example to the jetting temperature, to a temperature equal to the top limit at which the ink is pressure-transferable (this situation corresponds to the practical printing situation in which an ink drop is also transferred from a melted state to a transfer element in order to assume the lower temperature of that element there). At this temperature, the ink is stabilized until—as in the case of the stabilization described in Example 5—both the ink and the apparatus are in equilibrium. Before an ink is exposed to this measurement, it may be necessary to check, by means of a DSC measurement, whether an ink cooled in this way and kept at the top limit temperature for the time required to carry out the measurement with the RSA (some 20 minutes in all) remains stable. If an ink were to partially crystallize, for example, in the said time interval, the measurement on the RSA would not be representative of actual practice in which the ink, after cooling on the transfer element, is transferred practically directly to the receiving material and hence has no chance to crystallize at the top limit. In such a case, the RSA measurement must be accelerated and may at most occupy the time in which the ink remains stable. This can be optimized, for example, by the temperature stabilization.

Figure 5:
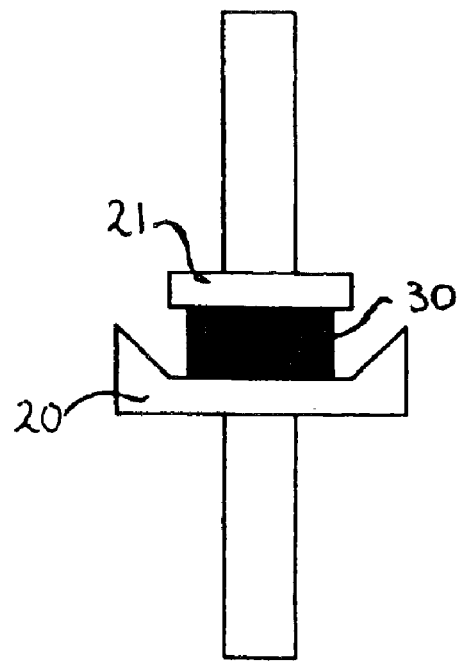
FIG. 5. Bottom plate and top plate for the measurement in accordance with Example 6.

To enable the ink to be measured from the liquid state, a bottom plate has been developed for the RSA and is shown diagrammatically in FIG. 5. Like the top plate, this round bottom plate has a flat part with a diameter of 5.0 mm but an obliquely sloping edge so that liquid ink can be kept on the bottom plate. The determination starts by weighing a quantity of ink such that said ink in the melted state occupies a volume of about 20 $mm^3$. This ink is transferred to the bottom plate 20 of the RSA. The ink is then melted at 120° C., so that it assumes a drop form (not shown). The top plate 21, which is also at a temperature of 120° C., is then brought above the bottom plate to a height of 1 mm, the top plate being situated exactly above the flat part of the bottom plate. As a result, the ink 30 will form a cylindrical column between the two plates as shown in FIG. 5. If this column does not form automatically, the top plate can first be brought closer to the bottom plate, for example, to a distance of 0.5 mm, until contact is made with the liquid ink, whereafter the distance is again increased to 1 mm. The ink is then cooled in about three steps to the measuring temperature (i.e. the top limit at which the ink is pressure-transferable). After each step, the ink is stabilized for about 5 minutes at the relevant temperature. In order to prevent stress in the ink as a result of shrinkage of the ink and shrinkage of the top and bottom plates, the stress is automatically kept at zero (the distance between the plates being reduced for this purpose). As soon as the measuring temperature is reached, and the rig is sufficiently stabilized, a situation has occurred which corresponds to the practical situation, i.e. a drop of liquid ink which cools from a high temperature to the top limit. The actual measurement can then start. For this purpose, the cylindrical ink column is compressed at a rate of 4% per second until a 20% deformation is reached. The deformation energy for 20% deformation can be readily derived from this as shown in Example 5. With the RSA measurements as described in Examples 5 and 6, it is possible to measure deformation energies up to $25 \times 10^5$ Pa.s. The inks known from the prior art, however, often have a deformation energy outside that range. In order to enable the deformation to also be determined, use must be made of a less sensitive apparatus, for example, a dynamic tension bench such as the MTS 831 Elastomer Test System (MTS Systems Corporation). In this apparatus, in a comparable manner to that indicated in Examples 5 and 6 but with ink pellets of larger dimensions, typically 9.5 mm in cross-section and 8 mm in height, it is possible to apply deformations at an elevated temperature, from which it is possible to determine from the required measured stress the deformation energy in Pa.s for 20% deformation of the pellet. The spread in this measurement is relatively small for deformation energies above $25 \times 10^5$ Pa.s, and depends inter alia again on the plane-parallel nature of the top and bottom of the ink pellet.

EXAMPLE 7

Pressure-transferable inks are known from the prior art, for example, U.S. Pat. No. 5,372,852 and U.S. Pat. No. 6,174,937. These inks are marketed by Xerox Corporation under the names ColorStix Ink and are supplied for the Phaser 340/350 printers (described in the '852 patent), for Phaser 840 printers (described in the '852 patent) and for Phaser 860 printers (probably the same as inks described in the '937 patent). Inks of this kind have at the top limit a deformation energy which is far above $20 \times 05$ Pa.s. The deformation energies for these inks are accordingly determined using the MTS 831 as described in Example 6 and are shown in Table 1.

TABLE 1

Deformation energies in Pa · s of inks known from the prior art

| Type of ink | Top limit [° C.] | Deformation energy at top limit [Pa · s] |
|---|---|---|
| ColorStix Ink (Black) Phaser 340/350 | 63 | $40 \times 10^5$ |
| ColorStix Ink (Black) Phaser 840 | 63 | $40 \times 10^5$ |
| ColorStix II Ink (Black) Phaser 860 | 64 | $42 \times 10^5$ |

In order to transfer these inks, a high transfer pressure is applied which in the printers in question is achieved by using a metal transfer element which is pressed at high pressure against a roller with the formation of a transfer nip. Also, in the printers the transfer element is provided with a sacrifice layer of silicone oil. It is not possible to transfer these inks with a sufficient yield (more than 90%) with, for example, a rubberized transfer element without a sacrifice layer and under low pressure.

EXAMPLE 8

This Example gives inks according to the present invention. Table 2 is a diagrammatic enumeration of a number of these inks.

Ink 1 is an ink containing 50% binder of the Uratak type, in this case Uratak 68520, a semi-crystalline binder of DSM (Netherlands) and 50% of a crystalline thickener, namely octadecanamide, abbreviated to ODA.

Ink 2, in addition to a small quantity of Uratak, contains 85% of the amorphously solidifying softener pentaerythritol-tetrabenzoate (PETB) and 10% octadecanamide.

Ink 3 contains the same components, but in a different ratio.

Ink 4 contains one-third Künstharz AP, a binder of Hüls, one-third of the amorphously solidifying softener BIPANI, which is the ester of 2,2'-biphenol and methoxybenzoic acid as known from U.S. Pat. No. 6,280,510, and one-third octadecanamide.

Ink 5 contains one-third Uratak, one-third polycyclohexanone (# 468541, Aldrich; CAS number 9004-41-2) abbreviated to PCH, and one-third octadecanamide.

Ink 6 is practically identical to ink 2 but contains as crystalline thickener gel-4, a compound known under this abbreviation from Table 1 of EP 1 067 157 A1.

Ink 7 also contains a small quantity of Uratak and in addition 66.2% of the amorphously solidifying softener Glypochi which is known from Table 3a, Section H, of EP 1 067 157 A1. The crystalline thickeners that this ink contains are 7.6% n-hexatriacontane (CAS number 630-06-8) (abbreviated to HTC) and 22.1% Kemamide E, an unsaturated primary amide of Witco.

Ink 8 contains in equal quantities Künstharz AP, PETB and gel-4.

Ink 9 contains 60% of the crystalline-solidifying softener pentaerythritol-tetrastearate (PETS) and 40% of the crystalline thickener Behenon (22-tritetra-contanon; CAS number 591-71-9).

Only the meltable fraction, or carrier fraction, is given of the above inks. It should be clear that for practical application dyes and/or pigments are often added to these inks, or other additives such as surfactants, anti-oxidants, UV stabilizers, etc.

All of these inks are pressure-transferable and have a deformation energy at the top limit of less than $20 \times 10^5$ Pa.s as shown in Table 2. The deformation energies are measured as indicated in Example 5.

TABLE 2

Inks according to the present invention

| Ink | Binder [% by weight] | Softener [% by weight] | Thickener [% by weight] | Top limit [° C.] | Deformation energy [$10^5$ Pa · s] |
|---|---|---|---|---|---|
| 1 | Uratak, 50% | — | ODA, 50% | 75 | 7.2 |
| 2 | Uratak, 5% | PETB, 85% | ODA, 10% | 55 | 0.75 |
| 3 | Uratak, 33.3% | PETB, 33.3% | ODA, 33.3% | 70 | 1.5 |
| 4 | Künstharz AP, 33.3% | BIPANI, 33.3% | ODA, 33.3% | 80 | 1.2 |
| 5 | Uratak, 33.3% | PCH, 33.3% | ODA, 33.3% | 75 | 6.3 |
| 6 | Uratak, 5% | PETB, 85% | gel-4, 10% | 50 | 0.3 |
| 7 | Uratak, 4.1% | Glypochi, 66.2% | HTC, 7.6% en Kemamide E, 22.1 % | 45 | 2.4 |
| 8 | Künstharz AP, 33.3% | PETB, 33.3% | gel-4, 33.3% | 85 | 1.1 |
| 9 | — | PETS, 60% | Behenon, 40% | 80 | 3.3 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A meltable ink which is solid at room temperature and liquid at a higher temperature, which ink is suitable for use in an indirect printing process, in which printing process the ink is transferred, by the use of an inkjet printhead, in the form of individual ink drops to a transfer element, whereafter the ink is transferred to a receiving material by bringing the transfer element into contact with said receiving material under pressure, said ink having a composition such that it is pressure-transferable at a temperature between a bottom temperature limit and a top temperature limit, wherein the ink has a deformation energy of less than $20 \times 10^5$ Pa.s at a temperature equal to the top temperature limit and wherein the ink composition comprises a meltable fraction containing at least a crystalline part and optionally an amorphous part.

2. A meltable ink according to claim 1, wherein the ink has a deformation energy less than $10 \times 10^5$ Pa.s at a temperature equal to the top limit.

3. A meltable ink according to claim 2, wherein the ink has a deformation energy smaller than $2 \times 10^5$ Pa.s at a temperature equal to the top limit.

4. A meltable ink according to claim 1, 2 or 3, wherein the ink contains a semi-crystalline binder and a crystalline thickener.

5. A meltable ink according to claim 1, 2 or 3, wherein the ink contains a binder, an amorphously solidifying softener and a crystalline thickener.

6. A meltable ink according to claim 1, 2 or 3, wherein the ink contains a crystalline-solidifying softener, a crystalline thickener and optionally a binder.

7. A method of selecting a meltable ink which is solid at room temperature, suitable for use in an indirect printing process, in which printing process the ink is transferred, by the use of an inkjet printhead, to a transfer element, whereafter the ink is transferred under pressure from the transfer element to a receiving material, which ink has a composition such that said ink is pressure-transferable at a temperature between a bottom temperature limit and a top temperature limit, and wherein the ink composition comprises a meltable fraction containing at least a crystalline part and optionally an amorphous part, the method comprising:

determining whether the ink is pressure-transferable, determining the top temperature limit at which the ink is pressure-transferable, measuring the deformation energy of the ink at the said top temperature limit, and selecting the ink if the deformation energy is less than $20 \times 10^5$ Pa.s.

8. The method according to claim 7, wherein the ink is selected if the deformation energy is less than $10 \times 10^5$ Pa.s.

9. The method according to claim 7, wherein the ink is selected if the deformation energy is less than $2 \times 10^5$ Pa.s.

* * * * *